United States Patent [19]

Bellanger

[11] Patent Number: 4,747,301

[45] Date of Patent: May 31, 1988

[54] VEHICLE PERFORMANCE MONITORING APPARATUS

[75] Inventor: Regis Bellanger, Mississauga, Canada

[73] Assignee: Massey-Ferguson Services N.V., Curacao, Netherlands Antilles

[21] Appl. No.: 945,060

[22] PCT Filed: Apr. 2, 1986

[86] PCT No.: PCT/EP86/00197

§ 371 Date: Nov. 14, 1986

§ 102(e) Date: Nov. 14, 1986

[87] PCT Pub. No.: WO86/06190

PCT Pub. Date: Oct. 23, 1986

[30] Foreign Application Priority Data

Apr. 12, 1985 [GB] United Kingdom ................. 8509488

[51] Int. Cl.$^4$ ............................................. G01M 15/00

[52] U.S. Cl. ................................................. 73/117.3

[58] Field of Search ................. 73/117.3, 117.2, 118.1, 73/116; 340/684, 52 F, 517, 521; 364/424, 551, 579, 580

[56] References Cited

U.S. PATENT DOCUMENTS 4,140,996 2/1979 Leitch et al. ...................... 340/52 F
4,296,409 10/1981 Whitaker et al. .................. 340/684
4,419,654 12/1983 Funk ................................ 340/52 R
4,462,079 7/1984 Ito et al. ............................. 340/684

FOREIGN PATENT DOCUMENTS 0114018 7/1984 European Pat. Off. .
82/01354 4/1982 PCT Int'l Appl. .
2075687 11/1981 United Kingdom .

*Primary Examiner*—Stewart J. Levy
*Assistant Examiner*—Robert R. Raevis

[57] ABSTRACT

A vehicle performance monitoring apparatus (20) for displaying the values of a plurality of performance parameters of a vehicle (10). The apparatus includes sensors (21,22,23,24,25) for sensing data indicative of the performance of the vehicle, processing means (40,42) for processing this data to provide the parameter values, display means (35) for displaying said parameter values, and operator command means (37,38) for controlling the operation of the apparatus including the selection of which performance parameter is to be displayed on the display means and the initiation of processing routines by the processing means. Additionally the apparatus includes memory means (43,44,45) for storing performance information relating to the performance parameters and the processing means (40,42) is arranged in response to a predetermined operation of the operator command means (37,38) to store in the memory means (43,44,45) a performance parameter value for each of a number of so-called relative mode parameters. These stored values are used as reference values so that subsequently, when the apparatus is operated in so-called relative mode, the current performance parameter values for the relative mode parameters are processed by the processing means (40,42) and are each displayable on the display means (35) as proportions (e.g. percentages) of their respective reference value.

8 Claims, 5 Drawing Sheets

VEHICLE PERFORMANCE MONITORING APPARATUS

TECHNICAL FIELD

This invention relates to vehicle performance monitors and particularly, though not exclusively, to such monitors for use in vehicles such as agricultural and industrial tractors, combines and the like.

In the current environment of ever increasing vehicle operating costs, there is an increasing requirement for the provision of more detailed monitoring of vehicle operating performance in order to enable the vehicle operator to ensure a more cost effective operation of the vehicle.

DISCLOSURE OF THE INVENTION

It is an object of the present invention to provide an improved form of vehicle performance monitor which is particularly suitable for use in agricultural tractors and like vehicles.

Thus according to the present invention there is provided a vehicle performance monitoring apparatus for displaying the values of a plurality of performance parameters of a vehicle, said apparatus comprising sensing means for sensing data indicative of the performance of the vehicle, processing means for processing said data to provide said parameter values, display means for displaying said parameter values, and operator command means for controlling the operation of the apparatus including the selection of which performance parameter is to be displayed on the display means and the initiation of processing routines by the processing means, the apparatus being characterized by including memory means for storing performance information relating to said parameters and that said processing means is arranged such that in response to a predetermined operation of the operator command means a performance parameter value for each of a number of said parameters is stored in said memory means as a reference value so that subsequently, when the apparatus is operated in a relative mode, the current performance values for said one or more parameters (hereinafter referred to as the relative mode parameters) are processed by said processing means and are displayable on said display means as proportions of their respective reference values.

It is envisaged that the stored reference values will be generated by the processing means in response to the predetermined operation of the operator command means by taking the average value of the performance data coming from the appropriate sensors over a time period of say two seconds. This will guard against spurious readings due to short duration fluctuations in the data coming from the sensors.

The memory means may conveniently include memory locations (hereinafter referred to as the reference table memory locations) in which the last generated reference values of the relative mode parameters are stored and separate memory locations (hereinafter referred to as the scratch table memory locations) where performance parameter data on the relative mode parameters is accumulated or temporarily stored during the generation of a new set of reference values.

In a preferred arrangement in order for the operator to initiate the generation of a new set of reference valves he is required to continuously maintain a given operation of the command means (e.g. hold down a button) for a significant initiating time period of say two seconds to prevent accidental generation of new reference values. Thus to generate new reference values the operator operates the command means for two seconds and at the end of this two second period provided the operator continues to operate the command means, the apparatus commences the generation of the new reference values by sampling the sensors over the next two second period to generate the average values of the relative mode parameters. Thus the entire generation of the new reference values takes four seconds. At the end of this time the new reference values are copied into the reference table memory locations for future use.

As will be clear from the above, if the operator releases the command means before completion of the above four second period, generation of new reference values is either not commenced or if commenced not completed. In either event, as will be discussed in greater detail below, the apparatus will continue to use the previously generated reference values.

Conveniently, the monitoring apparatus can be configured so that immediately after the regeneration of new reference values has been completed the apparatus automatically operates in the relative mode. The apparatus is switchable by the operator command means between the relative mode in which the current values of the relative mode parameters are displayable relative to the reference values (for example as percentages) and the normal mode in which the actual current values of all the displayable parameters are displayable.

In a typical installation in accordance with the present invention applied to on agricultural tractor, examples of relative mode performance parameters are:

Vehicle Speed
Fuel/Area Worked
Fuel/Hour
Area Worked/Hour
Engine Speed
PTO Speed Thus if, for example, an operator is using an agricultural tractor in a field and wishes to know the effect on one or more of the above listed relative mode parameters of say a change in throttle opening or gear ratio, the operator would:

1. Make said predetermined operation of the operator command means to store reference values for the relative mode parameters in said memory means.
2. Change the throttle setting or gear ratio as desired.
3. View the current values of the relative mode parameters on the display means in the relative mode. These current values will be displayed as proportions (e.g. percentages) of the reference values.

Thus if, for example, the effect of the change in throttle opening and/or gear ratio was to increase fuel consumption/hour by say 5% the display means would display "r 105" if the fuel/hour parameter was selected for display by the operator. The "r" indicates and warns that the apparatus is operating in the relative mode. Clearly such information is an invaluable tool to the operator in ensuring the economical operation of the tractor.

DESCRIPTION OF THE DRAWINGS

One embodiment of the present invention as applied to a monitoring apparatus for use on an agricultural tractor will now be described, by way of example only, with reference to the accompanying drawings in which.

DETAILED DESCRIPTION

Figure 1:
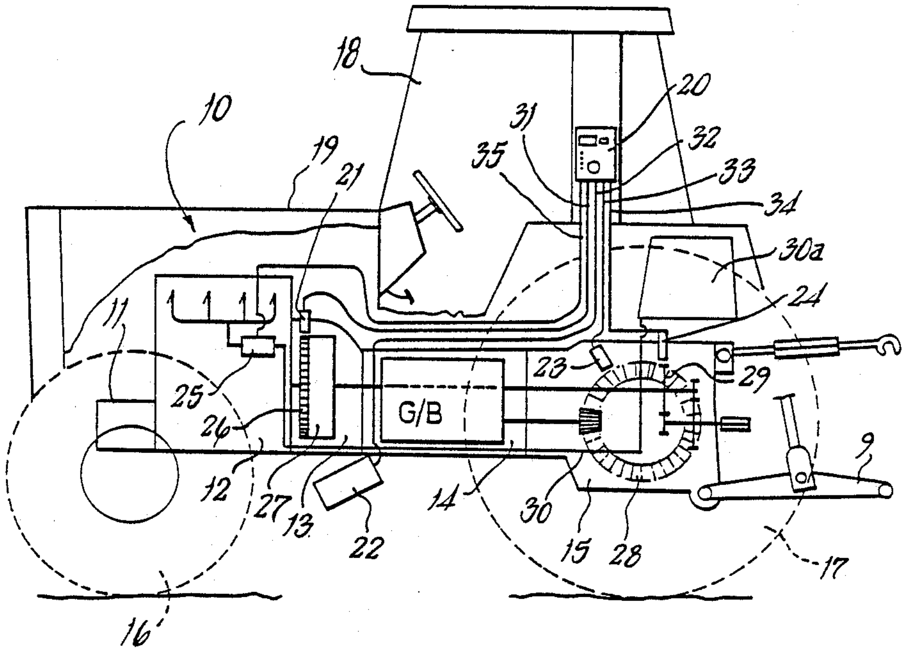
FIG. 1 is a diagrammatic representation of an agricultural tractor fitted with a monitoring apparatus in accordance with the present invention.

Referrring to FIG. 1, the tractor 10 comprises a chassis built up from a series arrangement of castings constituted by a front axle support 11, an engine block 12, a clutch housing 13, a gearbox housing 14 and a back axle housing 15. The chassis is supported on front and rear wheels 16 and 17 respectively and carries a cab 18, an engine hood 19 and a rear three-point hitch 9 controlled by a hitch control system (not shown).

The monitoring apparatus comprises a main unit 20 and a number of performance sensors 21 to 25. In the example illustrated, the main unit 20 is mounted on the inside of one of the vertical cab posts, but it will be appreciated that the unit 20 could be mounted in any location convenient for the tractor operator.

In the particular example to be described the sensors provide data directly indicative of the following factors:

| Sensor Unit | Factor |
|---|---|
| 21 | Engine Speed |
| 22 | Actual Vehicle Speed |
| 23 | Theoretical Vehicle Speed |
| 24 | PTO Shaft Rotation Speed |
| 25 | Fuel Flow Rate. |

Although the actual type of sensor used forms no part of the present invention, examples of suitable sensors will now be briefly discussed.

Sensor 21 is of the electro-magnetic type and is located adjacent the teeth 26 on the starter ring of the flywheel/clutch unit 27 so that as the teeth 26 pass the sensor a signal is generated by the sensor whose frequency is proportional to the speed of rotation of the flywheel and hence the engine speed.

Sensor 22 is a Doppler radar unit whose beam is directed in a downwardly sloping attitude and which provides a signal whose frequency is proportional to the actual speed of the vehicle over the ground in the known manner.

Sensors 23 and 24 are of a similar electro-magnetic type to sensor 21 and are respectively associated with crownwheel teeth 28 and the PTO drive gear teeth 29 thus respectively providing signals proportional to the actual speed of rotation of the rear driving wheels 17 (i.e. proportional to the theoretical speed of the vehicle) and the PTO shaft rotational speed.

Fuel flow sensor 25 is of the electro-magnetic type in which the speed of rotation of a small tubine element disposed in the fuel line 30 from a fuel tank 30a is measured to provide signals proportional to the fuel flow rate. Alternatively, in diesel engine applications the speed of movement of various parts of the diesel fuel injector pump can be monitored to provide signals proportional to fuel flow rate.

The sensors 21 to 25 are connected with the main unit 20 via lines 31 to 35 respectively. An external view of the main unit 20 is shown on a larger scale in FIG. 2.

Figure 2:
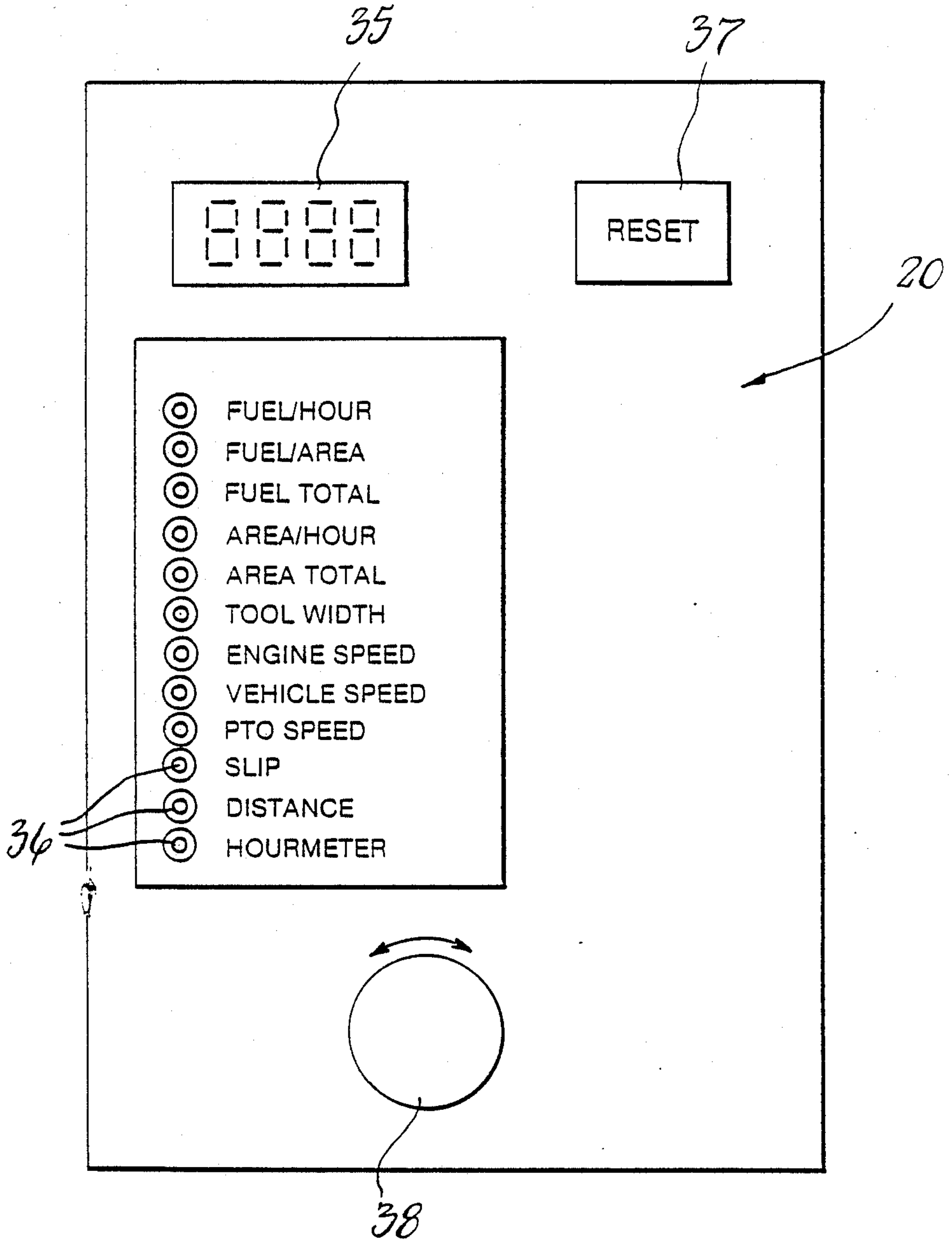
FIG. 2 is an exterior view on a larger scale of the main unit of the monitoring apparatus.

Externally the unit 20 has a display means in the form of a four digit LDC display 35 and a vertical array of LED's 36 each with its own caption to indicate the performance parameter being displayed on the LCD display. FIG. 2 shows a typical selection of the parameters which might be monitored in an agricultural tractor application.

The unit is provided with operator command means in the form of a reset button 37 and rotary knob 38. The button 37 and knob 38 constitute multi-function controls for the monitoring apparatus which, in addition to the functions which will be described below in relation to the present invention, also allow the operator to perform other functions such as:

(1) Resetting the accumulated data on a given displayed parameter to zero or any other positive value.

(2) Setting a given performance reference value to be used as a warning threshold on certain parameters (e.g. a level of slip above which a warning should be given or corrective action taken).

(3) Inputting data (e.g. implement width) required in calculations made by the monitoring apparatus to calculate certain displayed parameters (e.g. Fuel/Area worked).

Figure 3:
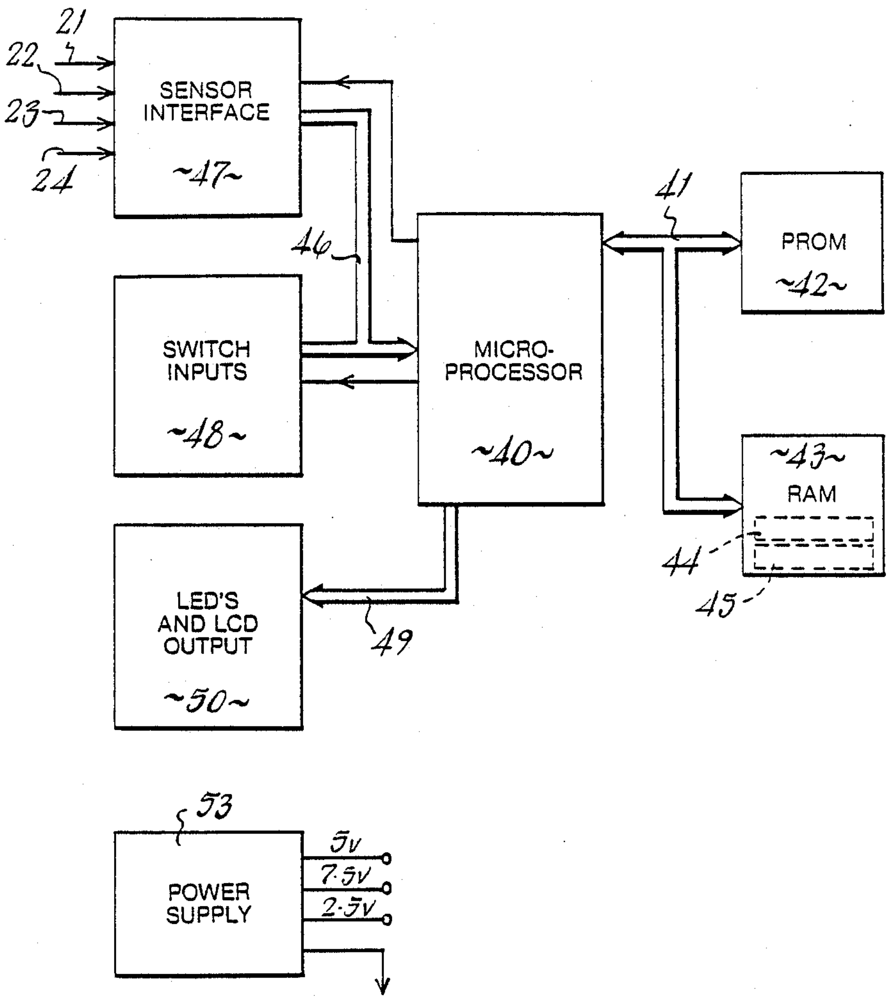
FIG. 3 is a block diagram of the hardware of the main unit.

The hardware of the main unit 20 is shown diagrammatically in FIG. 3 and is largely self-explanatory. At the heart of the unit is the processing means constituted by a microprocessor 40 and its associated PROM 42. Processor 40 communicates with PROM 42 and RAM 43 via bus 41. RAM 43, as will be referred to later below, includes reference table memory locations 44 and scratch table memory locations 45.

Processor 40 also communicates via bus 46 with as sensor interface 47 which converts the signals coming from sensors 21 to 24 into signals which can be read and processed by the processor 40. The reset button 37 and control 38 are shown diagrammatically in FIG. 3 as the switch inputs box 48.

The LCD display output 35 and LED indicator lights 36 are shown diagrammatically in FIG. 3 by output box 50 which communicates with processor 40 via bus 49.

The hardware of the performance monitor is completed by the power supply 53 which has tappings for a variety of voltages required by different parts of the circuitry of the monitor.

In the particular version of the tractor performance monitor being described the following relative mode performance parameters are implemented:

Vehicle Speed
Fuel/Area Worked
Fuel/Hour
Area Worked/Hour
Engine Speed
PTO Speed As will be evident, these relative mode parameters (and indeed the non-relative mode parameters) are basically of two types. A first type in which a sensor provides a signal which is proportional to the parameter to be displayed (e.g. vehicle speed and PTO speed) and the processing means does no more than turn the sensor signals into displayable readings and a second type in which the processing means is also called upon to do some mathematical calculation and/or operate on more than one sensor signal, e.g. "fuel/area worked" where the processing means in addition to providing a fuel consumption figure is also called upon to calculate the area worked from the data indicating the distance travelled (derived from the signal from radar unit 22) and the width of the implement being used (which is an operator input as referred to briefly above).

Another example of a performance parameter which requires the processing means to operate on more than one sensor signal and perform mathematical calculations is the wheel slip parameter which requires the processing means to perform calculations on the actual vehicle speed and the theoretical vehicle speed signals in the known manner to provide, for example, a percentage wheel slip display capability.

Operation of a tractor performance monitor of the form described above will now be described with reference to FIGS. 4 and 5.

Assuming that the tractor is operating in a field and the operator wishes to know the effect of changing, for example, the engine throttle setting on the relative mode performance parameters, the operator would ensure that the currently stored reference values reflect the current operating conditions of the tractor by undertaking the following procedure.

Firstly, the selector knob 38 is rotated clockwise or anticlockwise to ensure that the monitor is displaying one of the six relative mode performance parameters itemized above. The operator then depresses the reset button 37. For the first two seconds of the depression of the reset button 37 the LCD display 35 goes blank. This is a waiting/decision period to ensure that the operator really does require the tractor performance monitor to go through a recalculation process for the reference values of the six relative mode parameters.

Assuming that the operator continues to depress the reset button after the two second decision period the recalculation of the reference values is initiated and the LCD display displays a chosen predetermined warning display (for example, "rrrr") to indicate that this recalculation is in progress. The recalculation process takes two seconds and at the end of this two second period, that is four seconds from the initial depress of the reset buttom 37, the LCD display automaticaly begins to display the instantaneous values of the currently selected performance parameter (indicated by the operation LED) as a percentage of the recalculated reference value. The initial display on LCD display 37 immediately after recalculation of the reference values is "r100". The "r" warns that the relative mode is operative and the "100" indicates that the current parameter value is the same as the new reference value.

The operator now makes the required change to the throttle setting and assuming that the operator has selected the Fuel/Hour parameter for display and the effect of the change in throttle setting is to worsen the fuel consumption per hour by say 5%, the LCD display 35 will display the reading "r 105" after the throttle setting change has been made. If the operator wishes to view the effect of the change in throttle setting on any of the other five relative mode parameters the operator simply turns knob 38 to switch to the required relative mode parameter to obtain a relative mode percentage display.

The operator is free to switch between the relative mode display in which the current values of the six relative mode parameters are displayable as percentages of the reference values currently stored in the reference table memory locations as described above and the normal mode in which the actual current values of all the displayable parameters of the tractor performance monitor are displayable on the LCD display. This switching between the relative and normal modes is achieved by simply depressing the reset button 37 and releasing this button within the initial two second decision period described above. Each such brief depression of the reset button 37 switches from one mode to the other.

Figure 4:
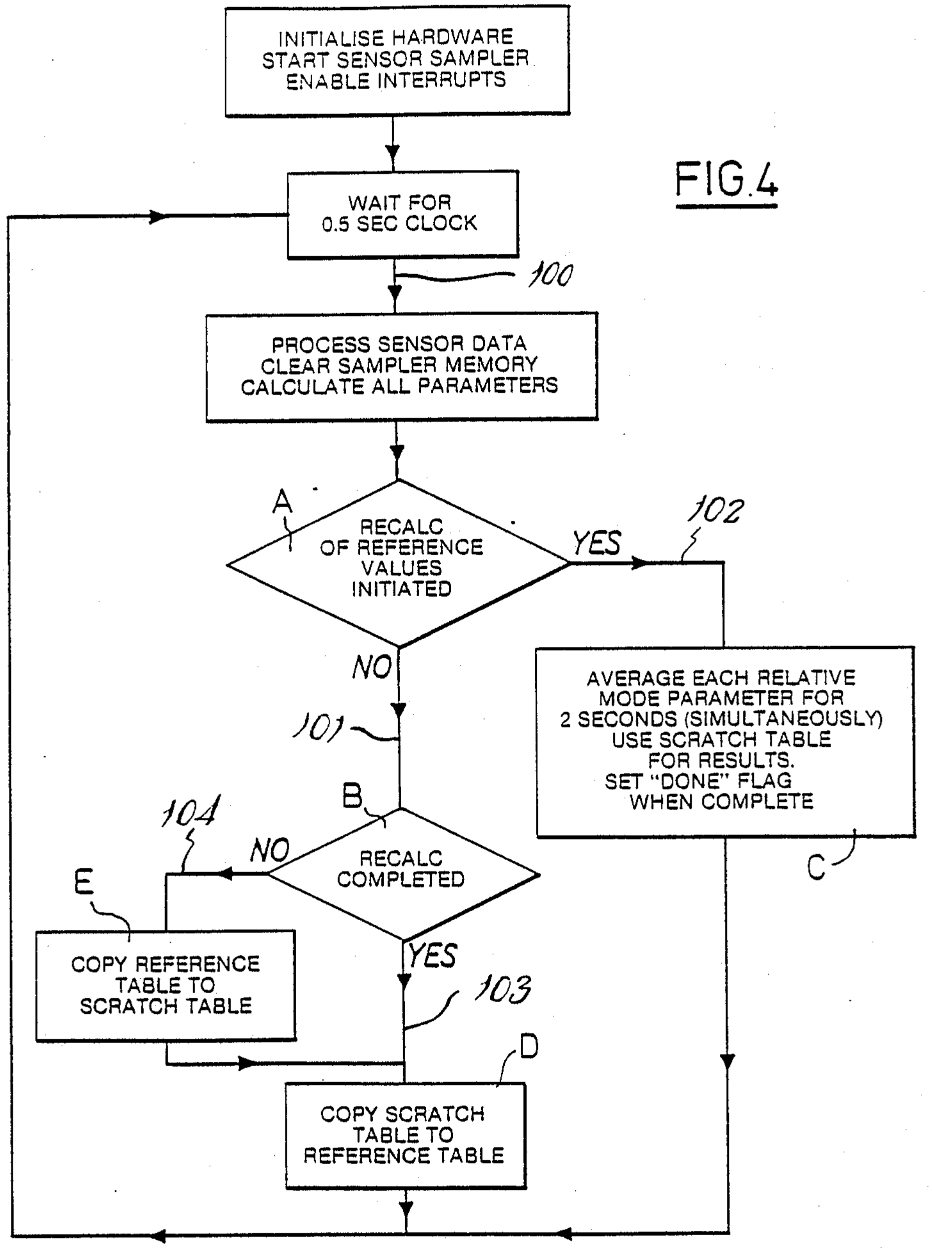
FIG. 4 is a flow diagram showing the logic loops used in the recalculation of reference values for the relative mode performance parameters.

FIG. 4 shows one form of logic diagram suitable for use in the recalculation of reference values in a monitoring system in accordance with the present invention. Referring to FIG. 4, it will be observed that this provides a logic loop 100 which is executed every half a second. This time period is chosen to correspond with the time period for updating of the LCD display 35 which is also half a second in the example chosen.

When the system is recalculating the reference values for the six relative mode parameters (see box C in FIG. 4) it is arranged to do so by calculating the average value of each of the six parameters over the two second recalculation period. Since the logic loop of FIG. 4 is executed every half a second the system in practice calculates the average value of each parameter for four consecutive average values.

During the recalculation of the reference values, performance data on the relative mode parameters is accumulated/temporarily stored in the scratch table memory locations 45. At the end of the two second recalculation period the new reference values for the relative mode parameters are transferred from the scratch table memory locations 45 to the reference table memory locations 44 for subsequent use when displaying the parameters in the relative mode (see box D of FIG. 4).

If the recalculation of the reference values is not successfully completed as a result of the operator removing his finger from the reset button 37 before the 4 second period is complete, the system is configured to ensure that the reference values stored in the reference table memory locations before the reset button was pressed are maintained in the reference table memory locations for future use.

This is achieved by the simple expedient of arranging that at the end of each successful or unsuccessful attempt to recalculate new reference values for the relative mode parameters the values in the scratch table memory locations are always copied into the reference table memory locations (see box D in FIG. 4) and in the event of an unsuccessful attempt to recalculate new reference values immediately prior to the above step of box D, the reference table values are copied into the scratch table memory locations (see box E of FIG. 4).

Decision box A of FIG. 4 relates to the depression of reset button 37 to initiate a recalculation of the reference values of the relative mode parameters. Thus until the initial two second decision period has passed, that is until the fifth time round loop 100, the logic loop will exit from box A via the "NO" branch 101. On the fifth time round loop 100 the logic loop will exit from box A via the "YES" branch 102 to initiate recalculation of the reference values (see box C).

When the recalculation of the reference values is complete in the scratch table memory locations a "done" flag is set in the microprocessor and the next time round loop 100 the logic loop exits from box A via "NO" branch 101 to decision box B.

Box B relates to the successful recalculation of new reference values. Thus following the setting of a "done" flag the logic loop exits from box B via "YES" branch 103 so that the new reference values are transferred from the scratch table memory locations 45 into the reference table memory locations 44 (see box D).

When the logic loop exits from box B via the "NO" branch 104, which will occur should the operator release the reset button before the end of the four second period required to complete the recalculation of the reference values, the current values in the reference table memory locations 44 are copied into the scratch table memory locations 45 (see box E) and these reference values are then copied back into the reference table memory locations 44 (see box D) to ensure that the original reference values are maintained as described earlier above.

Figure 5:
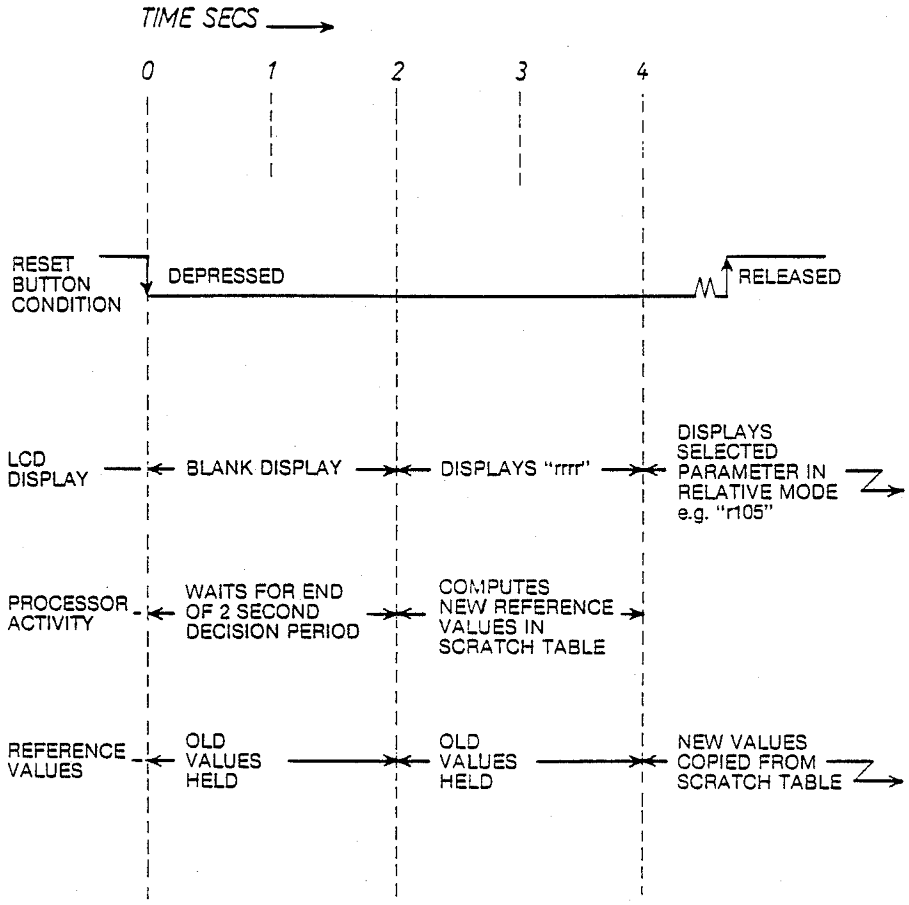
FIG. 5 is a diagrammatic representation on a time basis of the operating sequence of various parts of the monitoring apparatus.

FIG. 5 shows diagrammatically on a time basis the operating sequence for the reset button 37, the LCD display 35, the activity of microprocessor 40, and the status of the reference values in memory locations 44.

It will be appreciated from the above that the present invention provides an improved form of vehicle performance monitor which has the ability to store performance parameter values for the relative mode parameters and then to display the current performance parameter values as proportions of their respective reference values. This relative mode feature provides the operator with a particularly clear indication of the effect on the vehicle performance of changes in the vehicle operating settings.

I claim:

1. A vehicle performance monitoring apparatus for displaying the values of a plurality of performance parameters of a vehicle, said apparatus comprising sensing means for sensing data indicative of the performance of the vehicle, processing means for processing said data to derive said parameter values, memory means for storing performance information relating to said parameters, display means for displaying said parameter values, and operator command means for controlling the operation of the apparatus including the selection of which performance parameter is to be displayed on the display means and the initiation of processing routines by the processing means, one or more of the parameters being designated relative mode parameters and operation of the operator command means in a first predetermined manner causing the processing means to store in the memory means a current performance parameter value for each of said relative mode parameters as a reference value, subsequent operation of the operator command means in a second predetermined manner initiating operation of the apparatus in a relative mode in which a new current performance parameter value for each of the relative mode parameters is derived by the processing means and is displayable on the display means as a proportion of the reference value of each respective relative mode parameter.

2. An apparatus according to claim 1 in which the stored reference values are generated by the processing means taking the average value of the performance data coming from the sensors over a predetermined time period.

3. An apparatus according to claim 1 in which the memory means includes reference table memory locations in which the reference values of the relative mode parameters are stored and separate scratch table memory locations where performance parameter data on the relative mode parameters is accumulated or temporarily stored during the generation of a new set of reference values.

4. An apparatus according to claim 1 in which in order to initiate generation of new reference values the command means must be maintained in a given condition for a predetermined minimum initiating time period.

5. An apparatus according to claim 1 in which in order to complete generation of new reference values the command means must be maintained in said given condition for a further predetermined minimum time period after the end of the initiating time period.

6. An apparatus according to claim 1 in which immediately after the storing of reference values in the memory means, the apparatus automatically operates in the relative mode.

7. An apparatus according to claim 1 in which the display means displays a predetermined warning display during generation of a new set of reference values.

8. An apparatus according to claim 1 in which the display means displays a warning symbol when displaying a performance parameter as a proportion of the previously stored reference value in the relative mode.

* * * * *